US012571879B2

(12) United States Patent
Robinson

(10) Patent No.: US 12,571,879 B2
(45) Date of Patent: Mar. 10, 2026

(54) METHOD OF IMPROVING A RADAR SYSTEM, MODULE FOR IMPROVING A RADAR SYSTEM AND AN IMPROVED RADAR SYSTEM

(71) Applicant: Government of the United States, as represented by the Secretary of the Air Force, Wright-Patterson AFB, OH (US)

(72) Inventor: Benjamin Robinson, Kettering, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 230 days.

(21) Appl. No.: 18/226,375

(22) Filed: Jul. 26, 2023

(65) Prior Publication Data
US 2023/0384415 A1      Nov. 30, 2023

(51) Int. Cl.
| | |
|---|---|
| *G01S 7/292* | (2006.01) |
| *G01S 13/00* | (2006.01) |
| *G01S 13/56* | (2006.01) |

(52) U.S. Cl.
CPC .......... *G01S 7/2922* (2013.01); *G01S 13/006* (2013.01); *G01S 13/56* (2013.01)

(58) Field of Classification Search
CPC .... G01S 13/006; G01S 13/282; G01S 13/343; G01S 13/56; G01S 2013/0245;
(Continued)

(56) References Cited

U.S. PATENT DOCUMENTS

| | | |
|---|---|---|
| 6,252,540 B1 | 6/2001 | Hale et al. |
| 7,038,618 B2 | 5/2006 | Budic |

(Continued)

FOREIGN PATENT DOCUMENTS

| | | |
|---|---|---|
| EP | 3281026 B1 | 5/2019 |

OTHER PUBLICATIONS

E. P. Wigner, "On the statistical distribution of the widths and spacings of nuclear resonance levels," Mathematical Proceedings of the Cambridge Philosophical Society, Cambridge University Press, vol. 47 (1951) 790-798.

(Continued)

*Primary Examiner* — Peter M Bythrow
(74) *Attorney, Agent, or Firm* — AFMCLO/JAZ; Charles R. Figer, Jr.

(57) ABSTRACT
The present invention relates a method of improving a radar system, a module for improving a radar system and an improved radar system that are more efficient than current radar systems and methods of using same. Specifically, in the context of space-time adaptive processing at high angle-doppler resolutions, this advanced radar system utilizes an improved estimator of the interference covariance matrix together with the plug-in whiten-then-match filter. This improvement (a) roughly optimizes the output signal-to-interference-plus-noise, thereby increasing the probability of accurately detecting targets' angular positions and radial velocities, (b) maintains a roughly constant, and thus controllable, false alarm rate, and (c) sometimes associates data preprocessing steps with a Reed-Mallett-Brennan detection loss, providing a guideline for rejecting certain preprocessing steps. Collectively, these advancements signify a considerable leap forward in radar technology.

4 Claims, 1 Drawing Sheet

(58) Field of Classification Search

CPC ...... G01S 7/292; G01S 7/2922; G01S 7/2927;
G01S 7/354; G01S 7/414

See application file for complete search history.

(56) References Cited

U.S. PATENT DOCUMENTS

| | | | |
|---|---|---|---|
| 7,259,714 | B1 | 8/2007 | Cataldo |
| 7,474,258 | B1 | 1/2009 | Arikan et al. |
| 7,535,410 | B2 | 5/2009 | Suzuki |
| 8,633,850 | B2 | 1/2014 | Yu |
| 9,172,476 | B2 | 10/2015 | Nguyen et al. |
| 9,568,591 | B2 | 2/2017 | Morley |
| 10,175,341 | B2 | 1/2019 | Morley |
| 12,265,175 | B2 * | 4/2025 | Roger ..................... G01S 7/354 |
| 12,270,930 | B1 * | 4/2025 | Abatzoglou ............ G01S 7/023 |
| 2012/0062409 | A1 | 3/2012 | Pun et al. |
| 2012/0112954 | A1 * | 5/2012 | Kurono ..................... G01S 3/74 |
| | | | 342/147 |
| 2012/0249361 | A1 * | 10/2012 | Sahinoglu ........... G01S 13/5244 |
| | | | 342/159 |
| 2015/0123841 | A1 | 5/2015 | Morley |
| 2020/0116851 | A1 * | 4/2020 | Raghavan ............... G01S 7/414 |
| 2020/0408878 | A1 * | 12/2020 | Liang ...................... G01S 7/354 |
| 2021/0190907 | A1 * | 6/2021 | Sahara .................... G01S 13/42 |
| 2021/0208270 | A1 * | 7/2021 | Raghavan ............... G01S 7/414 |
| 2021/0333356 | A1 | 10/2021 | Robinson |
| 2022/0091232 | A1 * | 3/2022 | Foreman ............... G01S 13/534 |
| 2022/0091249 | A1 | 3/2022 | Raghavan |
| 2023/0350042 | A1 * | 11/2023 | Kolych ................. G01S 13/765 |
| 2024/0036186 | A1 * | 2/2024 | Johnson .................. G01S 7/292 |
| 2024/0168129 | A1 * | 5/2024 | Foreman ................. G01S 13/42 |

OTHER PUBLICATIONS

T. W. Anderson, "Asymptotic theory for principal component analysis," Annals of Mathematical Statistics, vol. 34 (1963) 122-148.

B. Kang et al., "Automatic rank estimation for practical STAP covariance estimation via an expected likelihood approach," IEEE Radar Conference (2015) 1388-1393.

L. R. Haff, "Empiracle Bayes estimation of the multivariate normal covariance matrix," The Annals of Statistics, vol. 8 (1980) 586-597.

B. Kang et al., "Rank-constrained maximum likelihood estimation of structure covariance matrices," IEEE Trans. Aerospace and Electronic Systems, vol. 50 (2014) 501-515.

O. Ledoit et al., "Eigenvectors of some large sample covariance matrix ensembles," Probab. Theory Relat. Fields., vol. 151 (2011) 233-264.

O. Ledoit et al., "Analytical nonlinear shrinkage of large-dimensional covariance matrices," University of Zurich Department of Economics Working Paper Series (2017) 56 pages total.

O. Ledoit et al., "Direct nonlinear shrinkage estimation of large-dimensional covariance matrices," University of Zurich Department of Economics Working Paper Series (2017) 46 pages total.

V. A. Marenko et al., "Distribution of eigenvalues for some sets of random matrices," Mathematics of the USSR-Sbornik, vol. 1 (1967) 457-483.

O. Ledoit et al., "A well-conditioned estimator for large-dimensional covariance matrices," Journal of Multivariate Analysis, vol. 88 (2004) 365-411.

I. S. Reed et al., "Rapid convergence rate in adaptive arrays," IEEE Transactions on Aerospace and Electronic Systems, vol. AES-10 (1974) 853-863.

B. D. Robinson, "Optimal rotation-equivariant covariance estimation for detection of high-dimensional signals," IEEE Radar Conference, (2019) 1-6.

M. Steiner et al., "Fast converging adaptive processor or a structured covariance matrix," IEEE Transactions on Aerospace and Electronic Systems vol. 36 (2000) 1115-1126.

M. Wax et al., "Detection of signals by information theoretic criteria," IEEE Transactions on Acoustics, Speech, and Signal Processing, vol. ASSP-33 (1985) 387-392.

J-H Won et al., "Condition-number-regularized covariance estimation," Journal of the Royal Statistical Society: Series B (Statistical Methodology), vol. 75 (2013) 427-450.

W. L. Melvin, "Chapter 12: Space-time adaptive processing for radar," IN Academic Press Library in Signal Processing, vol. 2 (2014) Ed: N. D. Sidiropoulos et al., 595-665.

Combernoux, Alice, "Performance of Low Rank Detectors Based on Random Matrix Theory with Application to STAP". 2014 International Radar Conference IEEE (Year: 2014).

Krithman, Shira, "Non-Parametric Detection of the Number of Signals: Hypothesis Testing and Random Matrix Theory", IEEE Transactions on Signal Processing, vol. 57, No. 10, Oct. 2009, pp. 3930-3941 (Year: 2009).

Ward, J.; "Space-time adaptive processing for airborne radar." Technical Report 105, 1994.

G. Golub et al., "Calculating the singular values and pseudo-inverse of a matrix", Journal of the Society for Industrial and Applied Mathematics, Series B: Numerical Analysis, 2(2):205-224, 1965.

United States Patent and Trademark Office, Non-Final Office Action dated Apr. 28, 2023 issued in U.S. Appl. No. 17/236,441; 12 pages.

F. C. Robey et al., "A CFAR adaptive matched filter detector", IEEE Transactions on Aerospace and Electronic Systems, 1992, 28(1):208-216.

B. D. Robinson et al., "Space-time adaptive detection at low sample support", arXiv preprint arXiv:2010.03388, 2020.

U.S. Appl. No. 18/117,168, filed Mar. 3, 2023.

* cited by examiner

Determinine a required threshold η

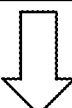

Compute an estimated interference covariance matrix
for a clutter suppression

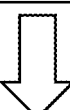

Compute a detection statistic for a set of space time sample
returns over one consecutive coherent processing intervals
for a given range

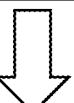

Compare said threshold η and said detection
statistic

If said detection statistic is greater than or equal to said threshold η
send an alert that a target exists to a radar operator.

METHOD OF IMPROVING A RADAR SYSTEM, MODULE FOR IMPROVING A RADAR SYSTEM AND AN IMPROVED RADAR SYSTEM

RIGHTS OF THE GOVERNMENT

The invention described herein may be manufactured and used by or for the Government of the United States for all governmental purposes without the payment of any royalty.

CROSS-REFERENCE TO RELATED APPLICATION

The present application is related to U.S. patent application Ser. No. 17/236,441 filed Apr. 21, 2021, which claims priority to U.S. Provisional Application Ser. No. 63/177,065 filed Apr. 20, 2021, and U.S. Provisional Application Ser. No. 63/013,565 filed Apr. 22, 2020, the contents of such applications hereby being incorporated by reference in their entireties.

FIELD OF THE INVENTION

The present invention relates a method of improving a radar system, a module for improving a radar system and an improved radar system.

BACKGROUND OF THE INVENTION

Current radar system and the methods of using same are inefficient as they require many independent, identically distributed training samples compared to the system's angle-doppler resolution, or data dimension, to estimate interference environment. Applicant recognizes that the source of this problem is the use of sub-optimal shrinkage estimates of interference covariance in plug-in matched filters.

As a result of aforementioned recognition, Applicant developed a radar system and method of using same wherein an approximately optimal estimate of the interference covariance matrix is used to make a decision on the presence or absence of a target. Such radar system and method of using same is more efficient due to a reduced requirement for independent and identically distributed training data in high dimension and/or a reduced need for dimensionality reduction, i.e., lower need to reduce angle-doppler resolution, provided dimension and training data number are of typical size. Put another way, any time training data set size and dimensionality are sufficiently large, the probability of a correct detection of the angle-doppler signature of a target in the interference environment is maximized within the class of filters that use covariance shrinkage for plug-in estimates.

SUMMARY OF THE INVENTION

The present invention relates a method of improving a radar system, a module for improving a radar system and an improved radar system that are more efficient than current radar systems and methods of using same. Such radar systems and methods of using same using employs an approximately optimal shrinkage estimate of the interference covariance matrix to make a decision on the presence or absence of a target. Such radar system and method of using same is more efficient as the output signal-to-interference-plus-noise (SINR) is typically increased over methods using different shrinkage estimators in high dimension.

Thus, the radar system is typically more effective at determining whether a signal return is from an actual target or is due to interference.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated in and constitute a part of this specification, illustrates embodiments of the present invention and, together with a general description of the invention given above, and the detailed description of the embodiments given below, serve to explain the principles of the present invention.

FIG. 1 is a process flow diagram for an embodiment of the invention detailed herein.

It should be understood that the appended drawing is not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiment have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used in this specification, the words "about," "approximately," or the like, when accompanying a numerical value, are to be construed as indicating a deviation as would be appreciated by one of ordinary skill in the art to operate satisfactorily for an intended purpose.

As used in this specification, the words "and/or" means, when referring to embodiments (for example an embodiment having elements A and/or B) that the embodiment may have element A alone, element B alone, or elements A and B taken together.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Method of Improving a Radar System

Applicants disclose a method for improving a radar unit's efficiency comprising, for a pre-specified probability of false alarm and a set of pre-specified system parameters: determining a required threshold; computing a detection statistic for a set of space time sample returns for one or more given ranges; comparing said threshold and said detection statistic; and if said detection statistic is greater than or equal to said threshold send an alert that a target exists to a radar operator.

Applicants disclose a method according to the previous paragraph wherein said one or more given ranges comprises a near radar range and a far radar range and one or more ranges in between said near and far radar ranges.

Improved a Radar System

Applicant discloses an improved radar system comprising: a radar radio frequency pulse generator; a signal transmitter; a radar phased array antenna; a pulse compression module; a frequency down conversion module; an analog-to-digital converter; a digital signal processing unit; a decision module; a control module; and a radar scheduler. Said radar system is programmed to, for a pre-specified probability of false alarm and a set of pre-specified system parameters: determining a required threshold; compute a detection statistic involving aforementioned optimal shrinkage estimator for a space time sample return for one given range; compare said threshold and said detection statistic; and if said detection statistic is greater than or equal to said threshold send an alert that a target exists to a radar operator. Said alert can be made by said control module.

Applicants disclose the radar system of the previous paragraph wherein said one or more given ranges comprises a near radar range and a far radar range and one or more ranges in between said near and far radar ranges.

Applicants disclose the radar system of the previous two paragraphs, said radar system comprising a data storage module.

Applicants disclose that in one aspect of the radar system disclosed in the three paragraphs above:

a) Said radar RF pulse generator may comprise a Linear Frequency Modulated (LFM) pulse generator that produces a sequence of uniformly spaced Radio Frequency (RF) pulses. The pulse sequence is the input to the signal transmitter.

b) The signal transmitter may amplify the sequence of RF pulses to the required power level and inputs the RF pulses to the set of transmit antenna array elements through a circulator whose function is to isolate the high power level transmit signals and prevent it from getting into the relatively low power level receive channels.

c) The receive phased array antenna is typically a uniformly spaced array of antenna elements. The spacing between adjacent elements is half the carrier wavelength ($\lambda/2$).

d) The clutter and target signal return correspond to the response for LFM pulses. These returns must be pulse compressed such that the return from a point target corresponds to an impulse. The pulse compression module filters the received time signal at each receive antenna unit by a time reversed LFM pulse response.

e) Radio Frequency signals need to be down converted to a suitable Intermediate Frequency (IF) for further processing. The down conversion is done by multiplying (i.e. mixing) the RF signal by the oscillator signal that was used to generate the transmit RF signal. Mixing is performed with the oscillator signals and a 90 degree phase shifted version of the oscillator signal. The pair of outputs are low pass filtered to retain the IF signal referred to as In-phase (I) and Quadrature (Q) components.

f) The function of the Analog-to-Digital processing unit is the digitize the input analog time signal. With higher sampling rates possible, the operation of A/D conversion can be moved further up in the processing chain and much of the remaining processing handled by the digital signal processing unit.

g) The digitized space-time data from all the range cells can be stored in a storage module if required or loaded into random access memory to be processed for real time applications; and h) The overall planning of the task sequence and timing is performed by a control module and radar scheduler. The communication and control is the function of the control module and radar scheduler. The control module communicates with the signal transmitter on when the pulses from each CPI are transmitted. The control module provides the timing needed to align the processes that perform the frequency down conversion, filtering and A/D conversion of signals received at each antenna element, corresponding to each pulse transmitted and all range cells.

In the present invention, the overall planning of the task sequence and timing is typically performed by a control module and radar scheduler; the communication and control is typically a function of the control module and radar scheduler; the control module typically communicates with the signal transmitter on when the pulses from each CPI are transmitted; the control module typically provides the timing needed to align the processes that perform the frequency down conversion, filtering and A/D conversion of signals received at each antenna element, corresponding to each pulse transmitted and all range cells; the DSP unit, typically processes interference-plus-noise training data to compute the $p \times p$ Hermitian interference-plus-noise covariance matrix S, and the optimal interference-plus-covariance matrix estimate $\tilde{S}$, from which the detection statistic W (specified in Detailed Mathematics of Method section of this specification) is evaluated. For a pre specified probability of false alarm, the required threshold $\eta$ is precomputed using the expressions in specified in Detailed Mathematics of Method section of this specification and the decision module implements the test also specified in specified in Detailed Mathematics of Method section of this specification.

Detailed Mathematics of Method

The mathematical details of Applicants' method are as follows. The acronym CPI denotes Coherent Processing Interval which is the time interval of a burst of pulses that are in phase coherence:

Arranging training data $y_i$ into matrix form:

$$Y=[y_1\ y_2 \ldots y_n]$$

Computing a sample interference-plus-noise covariance matrix from training data Y $$S = \sum_{i=1}^{n} y_i y_i^H$$

Computing an eigen-decomposition of S:

$$S=U\mathrm{diag}(\lambda_1, \lambda_2, \ldots, \lambda_p)U^H,$$

in which the eigenvalues $\lambda_i$ are listed in descending order and U is a unitary matrix Identifying the largest and smallest eigenvalues $\lambda_{max}$ and $\lambda_{min}$ Computing $h=n^{-0.35}$ Computing $f(\lambda_i)$ as $$f(\lambda_i) = \frac{1}{\min(n, \, p)} \sum_{j=(p-n)^+ +1}^{p} \frac{\sqrt{[4\lambda_j^2 h^2 - (\lambda_i - \lambda_j)^2]^+}}{2\lambda_j^2 h^2},$$

where $[x]^+ = x$ for $x>0$ and $0$ otherwise

Computing $g(\lambda_i)$ as $$g(\lambda_i) =$$

$$\frac{1}{\min(n, \, p)} \sum_{j=(p-n)^+ +1}^{p} \frac{\text{sgn}(\lambda_i - \lambda_j)\sqrt{[(\lambda_i - \lambda_j)^2 - 4\lambda_j^2 h^2]^+} - \lambda_i + \lambda_j}{2\lambda_j^2 h^2},$$

where $\text{sgn}(x)$ denotes the signum function

Computing the complex numbers $$m(\lambda_j) = g(\lambda_j) + if(\lambda_j)$$

Measuring a lower bound for a thermal noise power (in receive-only mode, e.g.): $\sigma^2$ Computing the values $\tilde{d}_i$ as $$\tilde{d}_i = \min\left(\lambda_{max}, \, \max\left(\sigma^2, \lambda_{min}, \, \frac{\lambda_i}{\left|1 - \frac{p}{n} - \frac{p}{n}\lambda_i m(\lambda_i)\right|^2}\right)\right)$$

Computing a new interference covariance estimator $\tilde{S}$ as $$\tilde{S} = U\text{diag}(\tilde{d}_1, \tilde{d}_2, \ldots, \tilde{d}_p)U^H$$

Matching a spatio-temporal template signal (angle-doppler signature) $\mu$ to z, a space-time vector from the range to be tested in the Coherent Processing Interval (CPI) received Calculating a Detection Statistic (plug-in whiten-then-match filter) W as $$W = \frac{\left|\mu^H \tilde{S}^{-1} z\right|^2}{\mu^H \tilde{S}^{-1} \mu}$$

Executing a decision rule of $H_1$ (target present) versus $H_0$ (target absent)

$$W \underset{H_0}{\overset{H_1}{\underset{<}{\overset{>}{}}}} \eta$$

The detection threshold $\eta$ that is used in the Decision Rule above, for a given approximate probability of false alarm ($P_{FA}$), is $\eta = \log_e(1/P_{FA})$.

This procedure optimizes W over shrinkage estimators S and gives approximate control of the false alarm rate in high dimension. This procedure can be further augmented for $n>p$ if its initial step (before computing W) is to assess the SINR loss associated with any preprocessing that may have been applied to the data. For this, we wish to estimate normalized SINR, sometimes known as Reed-Mallett-Brennan loss, for a given preprocessing procedure. This can be done for $n>p$ as follows:

Compute the "clairvoyant" SINR (CSINR):

$$CSINR = \frac{1}{p}\sum_{i=1}^{P} \frac{1 - \frac{p}{n} - 2\frac{p}{n}\lambda_i g(\lambda_j)}{\lambda_i} \quad \text{(assuming } n > p\text{)}$$

Compute Output SINR:

$$OSINR = \frac{1}{p}\text{trace}(\tilde{S}^{-1})$$

Compute Normalized SINR, aka Reed-Mallett-Brennan loss:

$$NSINR = OSINR/CSINR$$

For given preprocessing of data, check that NSINR is as large as desired (e.g., $>-3$ dB) If it is not, consider reducing dimension p further or pre-processing differently. For example, data that have been preprocessed using Joint Domain Localization (essentially, sub-sampling in angle-velocity space) could be re-processed, from the raw data, using a smaller but still acceptably anti-aliased joint domain. If the target NSINR is met and p is still on the same order as n, the system may proceed to the detection step. If not, further search through different preprocessing procedures may be necessary. This novel calculation provides operators for the first time with a rule of thumb for determining whether the optimal detector using shrinkage is sufficiently close in performance to the benchmark whiten-then-match filter, a feat which was formerly only possible for much more common but very sub-optimal ones, such as the plug-in whiten-then-match filter using S in place of $\tilde{S}$.

The aforementioned detailed mathematics (algorithm) can be programmed into a module that provides interference suppression as a result of such algorithm. Such module can be assembled by combining an analog to digital converter, an input/output controller, a random access memory unit, a central processing unit, a hard drive memory unit, and a unifying computer bus system. A signal from the radar unit is received via the analog-to-digital converter from an analytic sensor system, and the interference suppression is preformed via the input/output controller and the result is transmitted to a radar operator. The module can be programmed using a programming language, such as, C++, Matlab, VBA, C#, or another coding language. Such module is typically placed in the radar system's digital signal processing unit.

EXAMPLES

The following example illustrates particular properties and advantages of some of the embodiments of the present invention. Furthermore, these are examples of reduction to practice of the present invention and confirmation that the principles described in the present invention are therefore valid but should not be construed as in any way limiting the scope of the invention.

Example: Detection of an Unknown Space-Time Signal Return in Interference and Noise As an example of how the present invention would work, a radar system with signal transmission and reception capability would perform the operation of detecting a signal returned in the following manner. The target may be situated at an unknown range from the radar and at an unknown azimuth angle within the transmit beam and moving at an unknown velocity with respect to the radar. The processing requires receiving the signal returns over one Coherent Processing Interval (CPI). This constitutes a sequence of $N_T$ uniformly spaced transmitted pulses. After a time, interval determined by the range distance of the hypothesized target from the radar, a sum of the reflected radar clutter (i.e. interference) and a target reflection (if present) is received by each element of a receive antenna array comprising $N_R$ elements. Define $N=N_T \times N_R$, which denotes the number of space-time degrees of freedom. The received signals at each antenna element and over the duration of the CPI are down converted in frequency, passed through a low pass filter and sampled uniformly with a A/D converter. The sampled complex valued sequence from all receive elements and time duration of a CPI is grouped into a vector of length N elements. Such vectors are formed for all ranges of interest from the radar, with adjacent ranges separated by the width of the range resolution ($\partial R=c/2B$), where B is the bandwidth of the transmitted pulse and c is the speed of light in free space. The set of space-time vectors from a sequence of range cells and for the CPI is stored for future processing. The next step is the cancelation of clutter or interference in the received space-time vector in a selected range cell for the CPI, followed by correlation with a space-time steering vector indicating a particular angle-doppler signature. The interference cancellation is done by multiplying the received space-time vector by the negative-1/2 power of the optimal shrinkage estimate of the interference covariance matrix, estimated from K consecutive range cells that are in the neighborhood of the test cell. Similarly, the steering vector is multiplied by this matrix before the correlation step is performed. This detection process requires testing the received space-time vector with many steering vectors which are the space-time returns from a target at different assumed azimuths within the transmit beam and different target velocities which determines the Doppler shifts. This process allows determination of the angle-doppler signature of any target in the received space-time vector.

What is claimed is:

1. A method for improving a radar unit's efficiency comprising, for a pre-specified probability of false alarm and a set of pre-specified system parameters:

a) determining a required threshold $\eta$;

b) computing an estimated interference covariance matrix for a clutter suppression;

c) computing a detection statistic for a set of space time sample returns over one consecutive coherent processing intervals for a given range;

d) comparing said threshold $\eta$ and said detection statistic; and e) if said detection statistic is greater than or equal to said threshold $\eta$ send an alert that a target exists to a radar operator, wherein said computing an estimated interference covariance matrix for a clutter suppression comprises using the following algorithm:

Arranging training data $y_i$ into matrix form:

$$Y=[y_1 \ y_2 \ldots y_n]$$

Computing a sample interference-plus-noise covariance matrix from training data Y and Decision Rule H $$S = \sum_{i=1}^{n} y_i y_i^H$$

Computing an eigen-decomposition of S:

$$S=U\mathrm{diag}(\lambda_1, \lambda_2, \ldots, \lambda_p)U^H,$$

in which the eigenvalues $\lambda_i$ are listed in descending order and U is a unitary matrix Identifying the largest and smallest eigenvalues $\lambda_{max}$ and $\lambda_{min}$ Computing $h=n^{-0.35}$ Computing $f(\lambda_i)$ as $$f(\lambda_i) = \frac{1}{\min(n, p)} \sum_{j=(p-n)^+ +1}^{p} \frac{\sqrt{[4\lambda_j^2 h^2 - (\lambda_i - \lambda_j)^2]^+}}{2\lambda_j^2 h^2},$$

where $[x]^+=x$ for $x>0$ and 0 otherwise

Computing $g(\lambda_i)$ as $$g(\lambda_i) = \frac{1}{\min(n, p)} \sum_{j=(p-n)^+ +1}^{p} \frac{\mathrm{sgn}(\lambda_i - \lambda_j)\sqrt{[(\lambda_i - \lambda_j)^2 - 4\lambda_j^2 h^2]^+} - \lambda_i + \lambda_j}{2\lambda_j^2 h^2},$$

where $\mathrm{sgn}(\ )$ denotes the signum function

Computing the complex numbers $$m(\lambda_j)=g(\lambda_j)+if(\lambda_j)$$

Measuring a lower bound for a thermal noise power (in receive-only mode, e.g.): $\sigma^2$ Computing the values $\tilde{d}_i$ as $$\tilde{d}_i = \min\left(\lambda_{max}, \max\left(\sigma^2, \lambda_{min}, \frac{\lambda_i}{\left|1 - \frac{p}{n} - \frac{p}{n}\lambda_i m(\lambda_i)\right|^2}\right)\right)$$

Computing a new interference covariance estimator $\tilde{S}$ as $$\tilde{S}=U\mathrm{diag}(\tilde{d}_1, \tilde{d}_2, \ldots, \tilde{d}_p)U^H$$

Matching a spatio-temporal template signal (angle-doppler signature) $\mu$ to z, a space-time vector from the range to be tested in the Coherent Processing Interval (CPI) received Calculating a Detection Statistic (plug-in whiten-then-match filter) W as $$W = \frac{|\mu^H \tilde{S}^{-1} z|^2}{\mu^H \tilde{S}^{-1} \mu}$$

Executing a decision rule of $H_1$ (target present) versus $H_0$ (target absent)

$$W \underset{H_0}{\overset{H_1}{\lessgtr}} \eta$$

2. The method of claim 1 wherein said one or more given ranges comprises a near radar range and a far radar range and one or more ranges in between said near and far radar ranges.

3. A radar system comprising:

a) a radar radio frequency pulse generator;

b) a signal transmitter;

c) a radar phased array antenna;

d) a pulse compression module;

e) a frequency down conversion module;

f) an analog-to-digital converter;

g) a digital signal processing unit;

h) a decision module;

i) a control module and radar scheduler said radar system programmed to, for a pre-specified probability of false alarm and a set of pre-specified system parameters: determining a required threshold $\eta$; compute a detection statistic from an optimal interference covariance matrix estimate for a clutter suppression for a received space-time signal; compare said threshold $\eta$ and said detection statistic; and if said detection statistic is greater than or equal to said threshold $\eta$ send an alert that a target exists to a radar operator; and a data storage module that is programmed with the following algorithm for computing an estimated interference covariance matrix for a clutter suppression:

Arranging training data $y_i$ into matrix form:

$$Y=[y_1\ y_2\ \ldots\ y_n]$$

Computing a sample interference-plus-noise covariance matrix from training data Y and Decision Rule H $$S = \sum_{i=1}^{n} y_i y_i^H$$

Computing an eigen-decomposition of S:

$$S=U\mathrm{diag}(\lambda_1, \lambda_2, \ldots, \lambda_p)U^H,$$

in which the eigenvalues $\lambda_i$ are listed in descending order and U is a unitary matrix Identifying the largest and smallest eigenvalues $\lambda_{max}$ and $\lambda_{min}$ Computing $h=n^{-0.35}$ Computing $f(\lambda_i)$ as $$f(\lambda_1) = \frac{1}{\min(n,\,p)} \sum_{j=(p-n)^++1}^{p} \frac{\sqrt{\left[4\lambda_j^2 h^2 - (\lambda_i - \lambda_j)^2\right]^+}}{2\lambda_j^2 h^2},$$

where $[x]^+=x$ for $x>0$ and 0 otherwise

Computing $g(\lambda_i)$ as $$g(\lambda_i) = \frac{1}{\min(n,\,p)} \sum_{j=(p-n)^++1}^{p} \frac{\mathrm{sgn}(\lambda_i - \lambda_j)\sqrt{\left[(\lambda_i - \lambda_j)^2 - 4\lambda_j^2 h^2\right]^+} - \lambda_i + \lambda_j}{2\lambda_j^2 h^2},$$

where sgn( ) denotes the signum function

Computing the complex numbers $$m(\lambda_j)=g(\lambda_j)+\mathrm{if}(\lambda_j)$$

Measuring a lower bound for a thermal noise power (in receive-only mode, e.g.): $\sigma^2$ Computing the values $\tilde{d}_i$ as $$\tilde{d}_i = \min\left(\lambda_{max}, \max\left(\sigma^2, \lambda_{min}, \frac{\lambda_i}{\left|1 - \frac{p}{n} - \frac{p}{n}\lambda_i m(\lambda_i)\right|^2}\right)\right)$$

Computing a new interference covariance estimator $\tilde{S}$ as $$\tilde{S}=U\mathrm{diag}(\tilde{d}_1, \tilde{d}_2, \ldots, \tilde{d}_p)U^H$$

Matching a spatio-temporal template signal (angle-doppler signature) $\mu$ to z, a space-time vector from the range to be tested in the Coherent Processing Interval (CPI) received Calculating a Detection Statistic (plug-in whiten-then-match filter) W as $$W = \frac{\left|\mu^H \tilde{S}^{-1} z\right|^2}{\mu^H \tilde{S}^{-1} \mu}$$

Executing a decision rule of $H_1$ (target present) versus $H_0$ (target absent)

$$W \underset{\underset{H_0}{>}}{\overset{H_1}{<}} \eta$$

4. The radar system of claim 3 wherein said one or more given ranges comprises a near radar range and a far radar range and one or more ranges in between said near and far radar ranges.

\* \* \* \* \*